(12) United States Patent
Lee

(10) Patent No.: US 11,557,004 B2
(45) Date of Patent: Jan. 17, 2023

(54) APPARATUS AND METHOD FOR DEDUCING SOCIAL RELATION BETWEEN ACCOUNTS ON BASIS OF TRANSACTION LEDGER, AND APPARATUS AND METHOD FOR PROVIDING SOCIAL MEDIA SERVICE BY USING SAME

(71) Applicant: PAY GATE CO., LTD., Seoul (KR)

(72) Inventor: Dong San Lee, Seoul (KR)

(73) Assignee: PAY GATE CO., LTD., Seoul (KR)

( * ) Notice: Subject to any disclaimer, the term of this patent is extended or adjusted under 35 U.S.C. 154(b) by 314 days.

(21) Appl. No.: 16/895,456

(22) Filed: Jun. 8, 2020

(65) Prior Publication Data

US 2020/0327623 A1 Oct. 15, 2020

Related U.S. Application Data

(63) Continuation of application No. PCT/KR2017/014325, filed on Dec. 7, 2017.

(51) Int. Cl.
| | | |
|---|---|---|
| G06Q 50/00 | (2012.01) | |
| G06F 16/27 | (2019.01) | |
| G06F 16/23 | (2019.01) | |
| G06F 17/18 | (2006.01) | |
| G06Q 30/02 | (2012.01) | |
| G06F 16/2457 | (2019.01) | |

(52) U.S. Cl.
CPC ......... *G06Q 50/01* (2013.01); *G06F 16/2379* (2019.01); *G06F 16/24578* (2019.01); *G06F 16/27* (2019.01); *G06F 17/18* (2013.01); *G06Q 30/0201* (2013.01)

(58) Field of Classification Search
CPC .... G06Q 50/01; G06Q 30/0201; G06Q 30/02; G06Q 50/00; G06F 16/2379; G06F 16/24578; G06F 16/27; G06F 17/18
See application file for complete search history.

(56) References Cited

U.S. PATENT DOCUMENTS

| | | |
|---|---|---|
| 2015/0254651 A1 | 9/2015 | Ignatyev et al. |
| 2016/0371792 A1 | 12/2016 | Luo et al. |
| 2022/0005053 A1* | 1/2022 | Gurugubelli ....... G06Q 30/0631 |

FOREIGN PATENT DOCUMENTS

| | | |
|---|---|---|
| JP | 2012-064150 A | 3/2012 |
| KR | 10-2010-0045312 A | 5/2010 |
| KR | 10-1628007 B1 | 6/2016 |

OTHER PUBLICATIONS

International Search Report issued in PCT/KR2017/014325; dated Sep. 6, 2018.

* cited by examiner

*Primary Examiner* — Albert M Phillips, III
(74) *Attorney, Agent, or Firm* — Studebaker & Brackett PC

(57) ABSTRACT

Provided is an apparatus for deriving a social relation between accounts based on a transaction ledger, which includes: a data storage unit storing account information, software for deriving an inter-account social relation, and inter-account social relation information; and a processor deriving the social relation between the accounts based on a transaction ledger generated by transactions among users with the accounts.

18 Claims, 17 Drawing Sheets

FIG. 3

| Order | From address | Amount | To address |
|---|---|---|---|
| 1 | B | 30.386 | C |
| 2 | C | 1.5 | D |
| 3 | C | 27.386 | E |
| 4 | E | 26.386 | F |
| 5 | F | 23.286 | J |
| 6 | J | 23.281 | K |
| 7 | K | 16.281 | E |
| 8 | E | 15.281 | G |
| 9 | G | 14.231 | H |
| 10 | H | 12.23 | E |
| 11 | E | 12.23 | H |
| 12 | H | 12.23 | I |
| 13 | I | 1 | D |

FIG. 5

| Node | B | C | D | E | F | G | H | I | J | K |
|---|---|---|---|---|---|---|---|---|---|---|
| Size of Amt | 1 | 1.5 | 2.5 | 1 | 3.1 | 1.05 | 2.001 | 11.23 | 0.005 | 8 |
| # of neighborhood addresses | 1 | 3 | 2 | 5 | 2 | 2 | 3 | 2 | 2 | 2 |
| Change Ratio | 1.00% | 1.89% | 1.23% | 2.15% | 0.50% | 1.03% | 1.99% | 80.23% | 90.01% | 0.35% |
| Level of Identity Verification | 95.00% | 90.00% | 95.23% | 10.25% | 99.98% | 7.65% | 100% | 56.65% | 70.77% | 80.88% |

FIG. 6

| Node | B | C | D | E | F | G | H | I | J | K |
|---|---|---|---|---|---|---|---|---|---|---|
| Size of Amt | 1 | 1.5 | 2.5 | 1 | 3.1 | 1.05 | 2.001 | 11.23 | 0.005 | 8 |
| # of neighborhood addresses | 1 | 3 | 2 | 5 | 2 | 2 | 3 | 2 | 2 | 2 |
| Change Ratio | 1.00% | 1.89% | 1.23% | 2.15% | 0.50% | 1.03% | 1.99% | 80.23% | 90.01% | 0.35% |
| Level of Identity Verification | 95.00% | 90.00% | 95.23% | 10.25% | 99.98% | 7.65% | 100% | 56.65% | 70.77% | 80.88% |
| Local Weight | 0.94050 | 3.97346 | 4.70293 | 0.50148 | 6.16777 | 0.15900 | 5.88354 | 2.51545 | 0.00070 | 12.75520 |

FIG. 7

| Node | B | C | D | E | F | G | H | I | J | K |
|---|---|---|---|---|---|---|---|---|---|---|
| Size of Amt | 1 | 1.5 | 2.5 | 1 | 3.1 | 1.05 | 2.001 | 11.23 | 0.005 | 8 |
| # of neighborhood addresses | 1 | 3 | 2 | 5 | 2 | 2 | 3 | 2 | 2 | 2 |
| Change Ratio | 1.00% | 1.89% | 1.23% | 2.15% | 0.50% | 1.03% | 1.99% | 80.23% | 90.01% | 0.35% |
| Level of Identity Verification | 95.00% | 90.00% | 95.23% | 10.25% | 99.98% | 7.65% | 100% | 56.65% | 70.77% | 80.88% |
| Local Weight | 0.94050 | 3.97346 | 4.70293 | 0.50148 | 6.16777 | 0.15900 | 5.88354 | 2.51545 | 0.00070 | 12.75520 |
| Static Centrality | 0.02501 | 0.10568 | 0.12508 | 0.01334 | 0.16404 | 0.00423 | 0.15648 | 0.06690 | 0.00002 | 0.33923 |

FIG. 8

| Node | B | C | D | E | F | G | H | I | J | K |
|---|---|---|---|---|---|---|---|---|---|---|
| Size of Amt | 1 | 1.5 | 2.5 | 1 | 3.1 | 1.05 | 2.001 | 11.23 | 0.005 | 8 |
| # of neighborhood addresses | 1 | 3 | 2 | 5 | 2 | 2 | 3 | 2 | 2 | 2 |
| Change Ratio | 1.00% | 1.89% | 1.23% | 2.15% | 0.50% | 1.03% | 1.99% | 80.23% | 90.01% | 0.35% |
| Level of Identity Verification | 95.00% | 90.00% | 95.23% | 10.25% | 99.98% | 7.65% | 100% | 56.65% | 70.77% | 80.88% |
| Local Weight | 0.94050 | 3.97346 | 4.70293 | 0.50148 | 6.16777 | 0.15900 | 5.83354 | 2.51545 | 0.00070 | 12.75520 |
| Static Centrality | 0.02501 | 0.10568 | 0.12508 | 0.01334 | 0.16404 | 0.00423 | 0.15648 | 0.06690 | 0.00002 | 0.33923 |
| Self Ratio | | | | | 0.15 | | | | | |
| Weighted Centralities | 1.36662 | 4.32544 | 3.20118 | 7.10174 | 3.61798 | 2.48203 | 4.41489 | 2.98871 | 3.49534 | 4.60609 |

APPARATUS AND METHOD FOR DEDUCING SOCIAL RELATION BETWEEN ACCOUNTS ON BASIS OF TRANSACTION LEDGER, AND APPARATUS AND METHOD FOR PROVIDING SOCIAL MEDIA SERVICE BY USING SAME

CROSS-REFERENCE TO RELATED APPLICATIONS

The present application is a continuation of International Patent Application No. PCT/KR2017/014325 filed on Dec. 7, 2017. The disclosure of the above-listed application is hereby incorporated by reference herein in their entirety.

TECHNICAL FIELD

The present invention relates to an apparatus and a method for deriving a social relation between accounts based on a transaction ledger, and an apparatus and a method for providing a social media service using the same, and particularly, to an apparatus and a method for driving a social relation between accounts based on a transaction ledger, which derive a social relation between accounts based on a transaction ledger generated by a transaction between users possessing accounts and then perform data processing and transmission/reception for supporting community activities by using the same and calculate a weighted centrality scale of each account, and an apparatus and a method for providing a social media service using the same.

BACKGROUND ART

Accounts become identification information that distinguishes users between trading parties in general banking and blockchain transactions. When a random transaction occurs between the accounts, transaction details are recorded in a transaction ledger.

In the blockchain transaction, an address is assigned to each account. In the blockchain transaction, various digital virtual currencies with which online and offline payment for merchandises can be made through the addresses can be stored, transmitted, and paid.

The digital virtual currencies using the blockchain include Bitcoin, Litecoin, Darkcoin, Namecoin, Doggycoin, and Ethereum in addition to Bitcoin.

A common feature thereof is that the digital virtual currencies operate with a blockchain where all the transaction details that are traded online using the digital virtual currency that includes trader Bitcoin are collected and stored. A medium in which the transaction details are recorded is referred to as the transaction ledger.

Bitcoin has a structure in which there is no central device for issuing and managing currencies. Instead, the transaction of Bitcoin is performed by a peer-to-peer network (P2P) based distributed database, and is performed based on a public key cryptography.

Bitcoin having such a payment method can be used without providing information such as a card number, expiration date, CVC number, and personal information required for credit card payment, and has an advantage of low usage fee.

Further, Bitcoin is recorded on the blockchain, and an electronic wallet manages a public key and a private key for the address of the blockchain. In addition, Bitcoin transaction is made based on a public address derived from the public key.

Technical Problem

An object to be solved by the present invention is to provide an apparatus and a method for providing a social media service using the same, and particularly, to an apparatus and a method for driving a social relation between accounts based on a transaction ledger, which derive a social relation between accounts based on a transaction ledger generated by a transaction between users possessing accounts and then perform data processing and transmission/reception for supporting community activities by using the same and calculate a weighted centrality scale of each account, and an apparatus and a method for providing a social media service using the same.

Technical Solution

According to an aspect of the present invention, provided is an apparatus for deriving a social relation between accounts based on a transaction ledger, which includes: a data storage unit storing account information, software for deriving an inter-account social relation, and inter-account social relation information; and a processor deriving the social relation between the accounts based on a transaction ledger generated by transactions among users with the accounts.

According to another aspect of the present invention, provided is a method for deriving a social relation between accounts based on a transaction ledger, which includes: acquiring transaction information for a random account based on a transaction ledger generated by transactions among users with accounts; and deriving a social relation between respective accounts based on the acquired transaction information.

According to yet another aspect of the present invention, provided is an apparatus for providing a social media service, which includes: a data storage unit storing account information, inter-account social relation information, and social media service information; and a processor enabling transactions among users with the accounts based on the account information and performing data processing and transmission/reception for supporting community activities between the accounts by using a social relation between respective accounts derived based on a transaction ledger generated by the transactions and the social media service information.

The processor may inquire an inter-account social relation for the corresponding account for a user with a random account from an inter-account social relation deriving apparatus periodically or at a user's request.

The processor may perform data processing and transmission/reception for supporting community activities among the accounts by using value information of each account, which is calculated from the inter-account social relation and the social media service information.

According to still yet another aspect of the present invention, provided is a method for providing a social media service using a social relation between accounts based on a transaction ledger, which includes: inquiring, by a social media service providing apparatus, social relation information between respective accounts, which is derived based on a transaction ledger generated by transactions among users with accounts; and performing, by the social media service providing apparatus, data processing and transmission for supporting community activities by using the inquired social relation information of the account and prestored social media service information.

The method for providing a social media service using a social relation between accounts based on a transaction ledger may further include: inquiring value scale information of each account, which is calculated from the inter-account social relation; and performing data processing and transmission/reception for supporting community activities between the accounts by using the inquired value scale information and the social media service information.

The method for providing a social media service using a social relation between accounts based on a transaction ledger may further include differentially applying, by the social media service providing apparatus, fees and transaction limits applied in transactions according to a social relation between respective accounts or the value scale of the account.

Advantageous Effects

According to the present invention, various transactions such as financial transactions, mail transmission/reception, telephone transmission/reception, trade transaction, commodity transaction, media transmission/reception, and content transmission/reception between users with accounts are possible, and a social relation between the accounts can be derived based on a transaction ledger generated by the transaction and a value scale of each account can be calculated from the derived social relation.

According to the present invention, community activities are supported by using the social relation between the accounts derived with respect to each account and the calculated value scale to support social community activities based on reliability for a possessor of each account and provide psychological stability by performing the transaction.

Moreover, according to the present invention, it is possible to provide an auditor with an effect of increasing audit efficiency to determine and monitor important accounts.

According to the present invention, as possessors of accounts which have been already secured can implement a social media service based on the accounts, financial transactions using the accounts can be actively performed.

Further, according to the present invention, users who participate in transactions using the accounts can form various transactions and various communities through the social media service and interact with each other.

According to the present invention, it is possible to implement various types of social media services using blockchains.

BRIEF DESCRIPTION OF DRAWINGS

FIG. 3 is a diagram for describing a transaction ledger in an apparatus for deriving a social relation between accounts based on a transaction ledger according to an embodiment of the present invention.

FIG. 5 is a diagram for describing parameters of respective nodes in a social relation between accounts according to an embodiment of the present invention.

FIG. 6 is a table in which parameters of respective nodes including local weights are organized according to an embodiment of the present invention.

FIG. 7 is a table in which parameters of respective nodes including static centrality are organized according to an embodiment of the present invention.

FIG. 8 is a table in which parameters of respective nodes including weighted centrality are organized according to an embodiment of the present invention.

DETAILED DESCRIPTION

Figure 1:
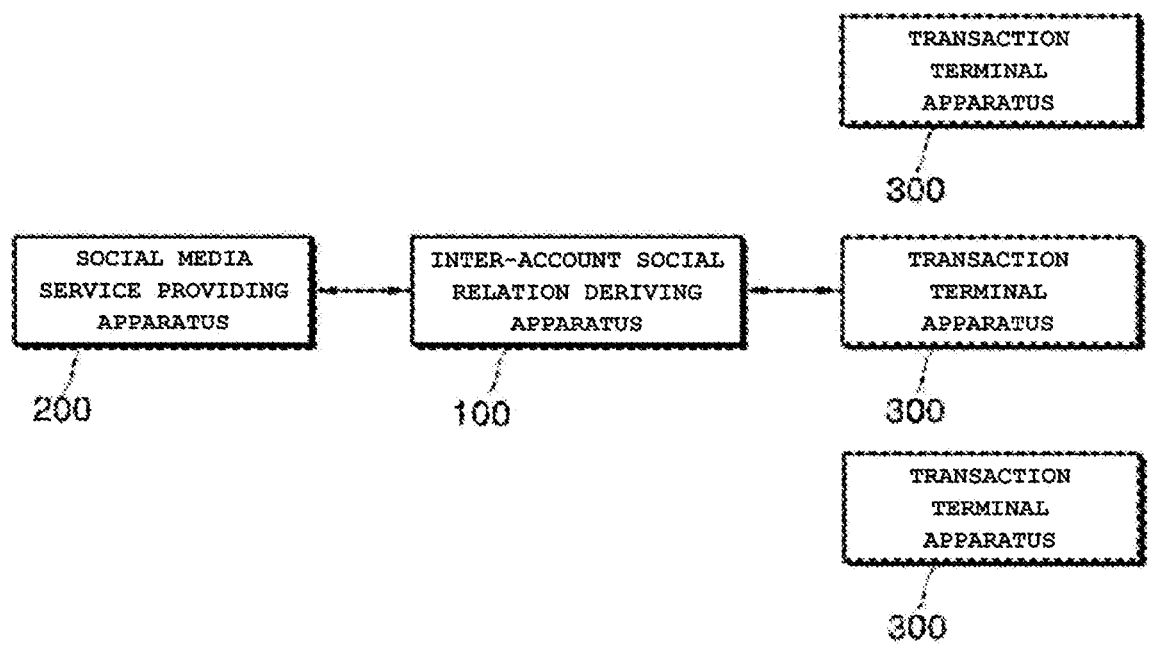
FIG. 1 is a diagram for describing a system for deriving a social relation between accounts and providing a social media service based on a transaction ledger according to an embodiment of the present invention.

The present invention may have various modifications and various embodiments and specific embodiments will be illustrated in the drawings and described in detail in the detailed description. However, this is not intended to limit the present invention to specific embodiments, and should be appreciated as including all modifications, equivalents, and substitutes included in the spirit and scope of the present invention.

In addition, in the present invention, the terms account, address, and node are appropriately selected and used to help understanding of the invention in correspondence with various characteristics of a transaction ledger and the present invention is not limited thereto and the transaction ledger means a unit subject commonly connected in a social relation.

Hereinafter, a preferred embodiment of the present invention will be described in detail with reference to the accompanying drawings.

FIG. 1 is a diagram for describing a system for deriving a social relation between accounts based on a transaction ledger and providing a social media service according to an embodiment of the present invention.

Referring to FIG. 1, the system for deriving a social relation between accounts based on a transaction ledger and providing a social media service according to an embodiment of the present invention may be configured to include an inter-account social relation deriving apparatus 100, a social media service providing apparatus 200, and a plurality of transaction terminal apparatuses 300.

The inter-account social relation deriving apparatus 100 may derive an inter-account social relation based on a transaction ledger generated by a transaction between users with accounts by performing communication with the plurality of transaction terminal apparatuses 300.

The inter-account social relation deriving apparatus 100 may calculate a value scale of a random account from the derived inter-account social relation.

Here, the transactions between the users possessing the accounts may include various transactions such as financial transactions, mail transmission/reception, telephone transmission/reception, trade transactions, commodity transactions, media transmission/reception, and content transmission/reception. The financial transactions may include a transaction of a digital virtual currency and a general banking transaction.

The social media service providing apparatus 200 may enable the transactions between the users possessing the accounts in link with the transaction ledger based inter-account social relation deriving apparatus 100 and perform data processing and transmission/reception for supporting community activities by using the derived inter-account social relation or the calculated value scale.

The plurality of transaction terminal apparatuses 300 is, for example, terminal apparatuses used for transacting the digital virtual currency by using a blockchain. A representative digital virtual currency using the blockchain may be Bitcoin.

The digital virtual currencies using the blockchain, which may be transacted by using the plurality of transaction terminal apparatuses 300 include Litecoin, Darkcoin, Namecoin, Doggycoin, and Ethereum in addition to Bitcoin.

A common feature thereof is that the digital virtual currencies operate with a blockchain where all the transaction details regarding trading made online using the digital virtual currency that includes trader Bitcoin are collected and stored by the plurality of transaction terminal apparatuses.

By displaying the transactions between respective accounts as a line, it is possible to derive the social relation between the respective accounts. The value scale of each account may be calculated from the derived social relation.

In this case, the inter-account social relation may have a higher value scale according to the number of transactions with another account. Alternatively, the inter-account social relation may have a higher value scale as the value scale of the transacted account is higher.

In order to measure the inter-account social relation, a centrality calculation scheme may be used.

For example, there may be various centrality calculation schemes such as Eigen Vector Centrality, Power Centrality, Degree Centrality, Closeness Centrality, Betweeness Centrality, and Priest Centrality.

All of the centrality calculation schemes include limitations that an 'n' value corresponding to a population should be determined.

Further, when the population is variable or too large to be difficult to calculate, the equation may be difficult to use.

For example, the Bitcoin blockchain is a numerical value that theoretically has a population size of 160 power of 2 (1,461,501,637,330,902,918,203,684,832,716,283,019,655, 932,542,976) and is difficult to handle with a general computing device.

Further, among the centrality calculation schemes, a page rank algorithm considering a relation may be expressed by the following equation.

$$PR(A) = (1-d) + d*(PR(T1)/C(T1) + \ldots + PR(Tn)/C(Tn))$$

PR: PageRank Value
d: damper value (0.85)
C: number of outlinks of Page

A page rank adopts only one variable as the number of outlinks in a page in determining a rank value.

Further, the page rank should converge to 1. As a result, when the number of the population is very large, there is a limit to calculating or expressing a difference between respective nodes.

Further, since the value of the page rank is determined only by other persons, the page rank has a limit of being difficult to reflect my own controllable factor.

The inter-account social relation may be effectively calculated by weighted centrality.

Figure 2:
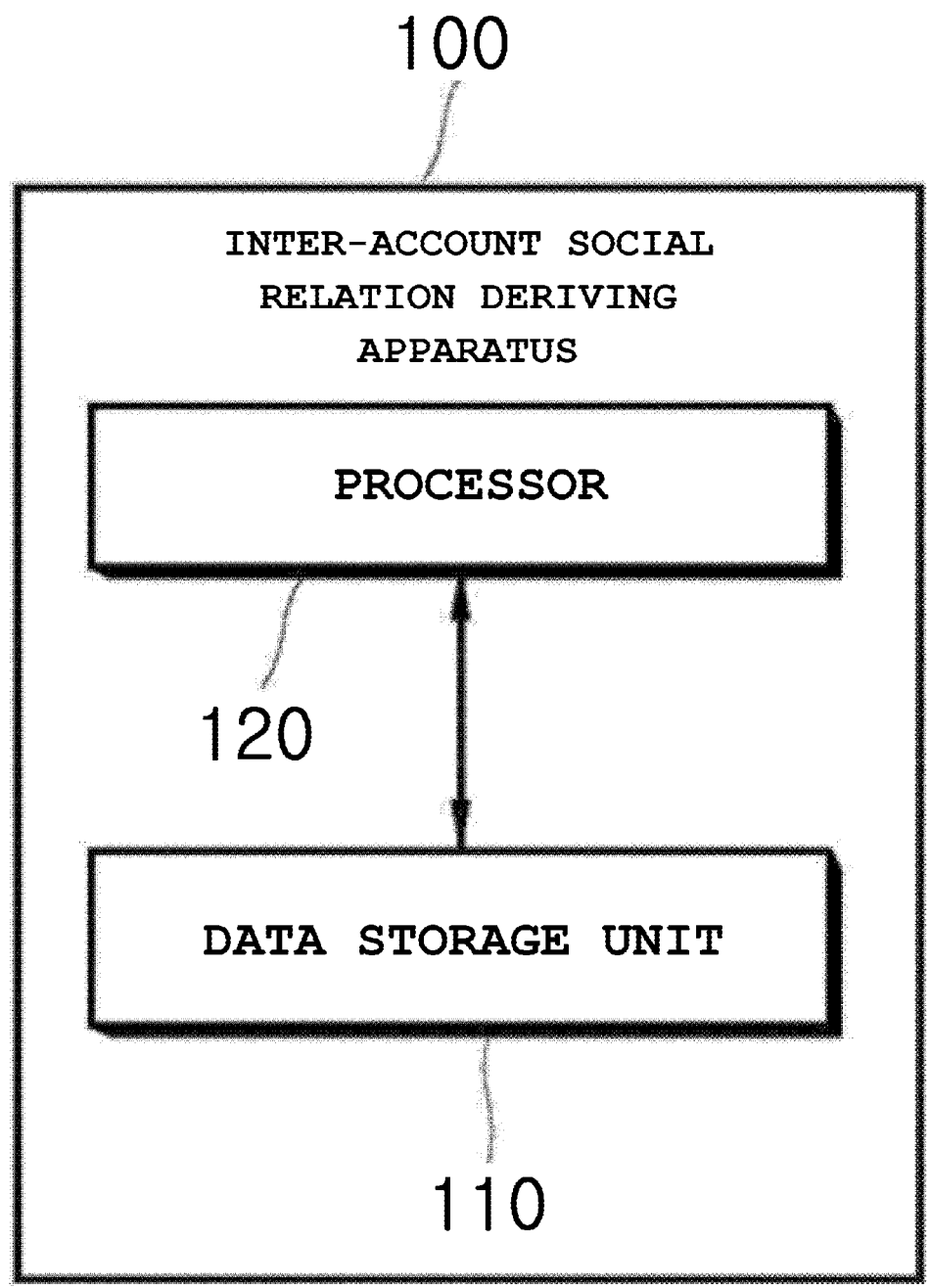
FIG. 2 is a diagram for describing an apparatus for deriving a social relation between accounts based on a transaction ledger according to an embodiment of the present invention.

FIG. 2 is a diagram for describing an apparatus for deriving a social relation between accounts based on a transaction ledger according to an embodiment of the present invention.

Referring to FIG. 2, the apparatus 100 for deriving a social relation between accounts based on a transaction ledger according to an embodiment of the present invention may be configured to include a data storage unit 110 and a processor 120.

The data storage unit 110 may store account information, inter-account social relation deriving and account value scale calculating software, derived inter-account social relation information, and the calculated value scale of the account.

Here, the account may include, for example, a blockchain address. Accordingly, the value scale of the blockchain address may be calculated as the value scale of the account. Here, the blockchain address may be a Bitcoin address which is one of the digital virtual currencies using the blockchain.

The digital virtual currencies using the blockchain include Litecoin, Darkcoin, Namecoin, Doggycoin, and Ethereum in addition to Bitcoin.

The present invention is not limited to Bitcoin, but may be applied to accounts using various digital virtual currencies using the blockchain, and furthermore, the present invention is not limited to the blockchain, but may also be applied to the general banking accounts. In addition, the present invention may be applied to various service accounts in addition to the financial accounts. For example, the present invention may be applied to phone number accounts, mail accounts, social media accounts, Internet address accounts, device identification information, TCP/IP, Mac address, space star identification information, and IoT identification information. That is, the present invention may be applied to various accounts capable of deriving the social relation between the accounts based on the transaction ledger between the accounts.

In the case of the blockchain, 400 to 500 transactions may be contained in one block. In recent years, there is a case where up to 1700 transactions are contained. When the block size increases, even more transactions may be contained. The transactions are made mutually between the blockchain addresses. One blockchain address may perform the transactions with a plurality of blockchain addresses.

The transaction may be known by viewing Bitcoin. Accordingly, a correlation between the blockchain addresses may be determined by using the transaction. A relation between the blockchain addresses is defined by using the transaction to determine a social relation network between possessors of respective blockchain addresses.

The processor 120 may derive the social relation of the respective accounts by using various additional data generated by the financial transactions between the users with the accounts and calculate the value scale of each account from the derived social relation.

The processor 120 may calculate the value scale of the account by a predetermined rule.

The value scale may include, for example, a value evaluation scale by evaluation.

The value evaluation scale may include a score scale. The value evaluation scale may include a grade scale. The grade scale may define a grade by classifying scores for each section.

The value scale may include, for example, a value prediction scale by prediction.

The value scale may be calculated by using transaction information of the account.

The transaction information may include transaction information of the corresponding account with another account.

The transaction information may include a transaction frequency with other accounts. As the transaction frequency is higher, a higher reliability scale may be assigned.

The transaction information may include the value scale of another account performing the transaction with the corresponding account.

For example, in a case where a transaction between a random account and an account having a high value scale occurs, a higher value scale may be assigned than that in a case where a transaction with an account having a relatively low value scale occurs.

The value scale of the account may be expressed by a plurality of badges according to a high or low value.

For example, the badges may be differentially classified, which include a first badge, a second badge, a third badge, and a fourth badge. For example, the first badge may be a diamond badge. The second badge may be a gold badge. The third badge may be a silver badge. The fourth badge may be a bronze badge. However, the present invention is not limited thereto, but the badge may be expressed, which includes characters of various material objects, immaterial objects, and works.

The value scale of the account may be expressed by a plurality of characters according to the high or low value. Here, the plurality of characters may be classified according to an importance of the account. Here, the plurality of characters may be classified according to a utilization pattern of the account. Here, the plurality of characters may be classified according to characteristics of the account. For example, the characteristics of the account may include the transaction size, the transaction frequency, a size of amount, and a transaction item.

The transaction information may include the amount information of the corresponding account.

The transaction information may include change ratio information of the corresponding account.

The value scale of the account may be calculated by using owner verification information of the account. For example, an account of which an owner is verified may be assigned with a differential value scale from an account of which the owner is not verified according to presence of the owner verification information.

The value scale of the account may include the reliability scale.

The social relation between the respective accounts and the calculated value scale of the account may be linked with a social media service account.

The processor 120 may derive the social relation between respective blockchain addresses by using the blockchain transaction as a relationship line between blockchain addresses.

To this end, the processor 120 may selectively use a weighted centrality scale, a size of amount, a level of identity verification, and a change ratio in order to calculate the value scale of each blockchain address based on the derived social relation.

The processor 120 may calculate the value scale by weighting the weighting centrality scale, the size of amount, the level of identity verification, and the change ratio.

For example, the processor 120 may give a weight of 30 to each of the weighting centrality scale, the size of amount, the level of identity verification and give a weight of 10 to the change ratio.

The processor 120 may calculate the weighted centrality scale with respect to a random blockchain address. The weighted centrality scale may reflect a correlation of a random blockchain address with another blockchain address.

The weighted centrality scale may be implemented by applying the page rank algorithm, but the present invention is not limited thereto.

The page rank is a method for assigning a weight to a document having a hyperlink structure such as World Wide Web according to a relative importance. The page rank is based on an observation that a more important page receives links from more other sites. For example, if page A has a total of three links to pages B, C, and D, B brings ⅓ of a page rank value of A.

Further, in the page rank, a model of randomly visiting and searching a page called Random Surfer is assumed. In the model, if a surfer that visits page A in the above example views and satisfies page A, the surfer will stop a search or if the surfer does not satisfy page A, the surfer will visit another page. If a damping factor is set to d, page B receives the page rank by d.

A page rank of predetermined page A is a sum of values acquired by normalizing page ranks of other pages citing the page. In other words, the page rank of page A becomes higher as a page rank value of another page indicating a page called A is larger. The page rank of page A is not a simple sum of page ranks. For example, even if any one page rank is high, if there are thousands of links on the page, a contribution weight of the page is reduced.

The processor 120 sets a section on the weighted centrality scale calculated for each blockchain address to determine the importance of a person who owns the blockchain address according to whether the weighted centrality scale belongs to the section.

Accordingly, when only a layout is viewed, the importance of the person may be known according to a section to which a value for a random Bitcoin address belongs.

The processor 120 may calculate the social relationship score for a random blockchain address by using the weighted centrality scale.

To this end, the processor 120 acquires blockchain transaction information for the random blockchain address.

The processor 120 derives the social relation between respective blockchain addresses based on the acquired blockchain transaction information and calculates the weighted centrality scale between the corresponding blockchain address and another blockchain address based on the derived social relation.

The processor 120 may calculate the size of amount for the random blockchain address. As the size of amount is larger, higher reliability may be given to the corresponding blockchain address.

The processor 120 may calculate the change ratio for the random blockchain address. As the change ratio is not higher, the higher reliability may be given to the corresponding blockchain address.

The processor 120 may calculate the weighted centrality scale by defining the following equation in order to calculate the value scale of each blockchain address.

$$WC(A)=LW(A)*sr+(1-sr)*(WC(N1)/NH(N1)+ \ldots +WC(Nn)/NH(Nn))$$

WC represents the weighted centrality, WC(A) represents the weighted centrality of node A, LW represents a local weight, and LW(A) represents the local weight of node A.

sr represents a self ratio, WC(N1) represents the weighted centrality of first neighborhood node N1 of node A, and WC(Nn) represents the weighted centrality of n-th neighborhood node Nn of node A.

NH represents the number of neighborhood nodes, NH(N1) represents the number of neighborhood nodes of first neighborhood node N1 of node A, and NH(Nn) represents the number of neighborhood nodes of n-th neighborhood node Nn of node A.

The sum of the weighted centrality of each node converges to the sum of local weights. In other words, the convergence value may be variously adjusted according to a calculation result of the local weight and a magnitude of the convergence value considering a case of a very large population may be set.

The weighted centrality becomes a value acquired by adding a value acquired by reflecting the self ratio to the local weight of the corresponding node and a value acquired by reflecting an external factor ratio without the self ratio to each sum of values acquired by dividing the weighted centrality of each node adjacent to the corresponding node by the number of adjacent nodes to the corresponding node.

The self ratio sr is a parameter for reflecting, in calculating the weighted centrality of one node, a self factor of the corresponding node. The self ratio may be expressed by a ratio under self control. For example, a reflection ratio of a value which is changed by a self effort may be determined.

For example, it may be calculated that the larger the size of an asset held by the corresponding node, the higher the value of the corresponding node. The increase in asset may be determined by the effort by an owner of the corresponding node.

Further, according to the level of identity verification, since the reliability of another factor may be determined according to the level of anonymity or a real name, the level of identity verification is a factor to which the self effort may be reflected.

Here, the number of neighborhood nodes is a numerical value of a node neighboring to the self node. In other words, the number of neighborhood nodes means the number of nodes performing the transaction with the corresponding node.

Further, since the convergence value of the weighted centrality is flexibly adjusted according to addition and subtraction of the node, it is possible to respond more flexibly to reflecting a total value of an entire network.

The local weight may be calculated by considering various factors which may be extracted from a local node.

Size of Amount
Number of Neighborhood nodes
Change Ratio
Number of Outbound or Inbound Transactions
Size of Outbound or Inbound Transaction
Level of Identity Verification LW calculation is not limited to the above parameters, but various additional factors capable of reflecting the value of the local node may be considered.

FIG. 3 is a diagram for describing a transaction ledger in an apparatus for deriving a social relation between accounts based on a transaction ledger according to an embodiment of the present invention.

Referring to FIG. 3, it may be known that there are thirteen transactions.

A first transaction involves a transaction from address B to address C and a transaction volume is 30.386.

A second transaction involves a transaction from address C to address D and the transaction volume is 1.5.

A third transaction involves a transaction from address C to address E and the transaction volume is 27.386.

A fourth transaction involves a transaction from address E to address F and the transaction volume is 26.386.

A fifth transaction involves a transaction from address F to address J and the transaction volume is 23.286.

A sixth transaction involves a transaction from address J to address K and the transaction volume is 23.281.

A seventh transaction involves a transaction from address K to address E and the transaction volume is 16.281.

An eighth transaction involves a transaction from address E to address G and the transaction volume is 15.281.

A ninth transaction involves a transaction from address G to address H and the transaction volume is 14.231.

A tenth transaction involves a transaction from address H to address E and the transaction volume is 12.23.

An eleventh transaction involves a transaction from address E to address H and the transaction volume is 12.23.

A twelfth transaction involves a transaction from address H to address I and the transaction volume is 12.23.

A thirteenth transaction involves a transaction from address I to address D and the transaction volume is 1.

Figure 4:
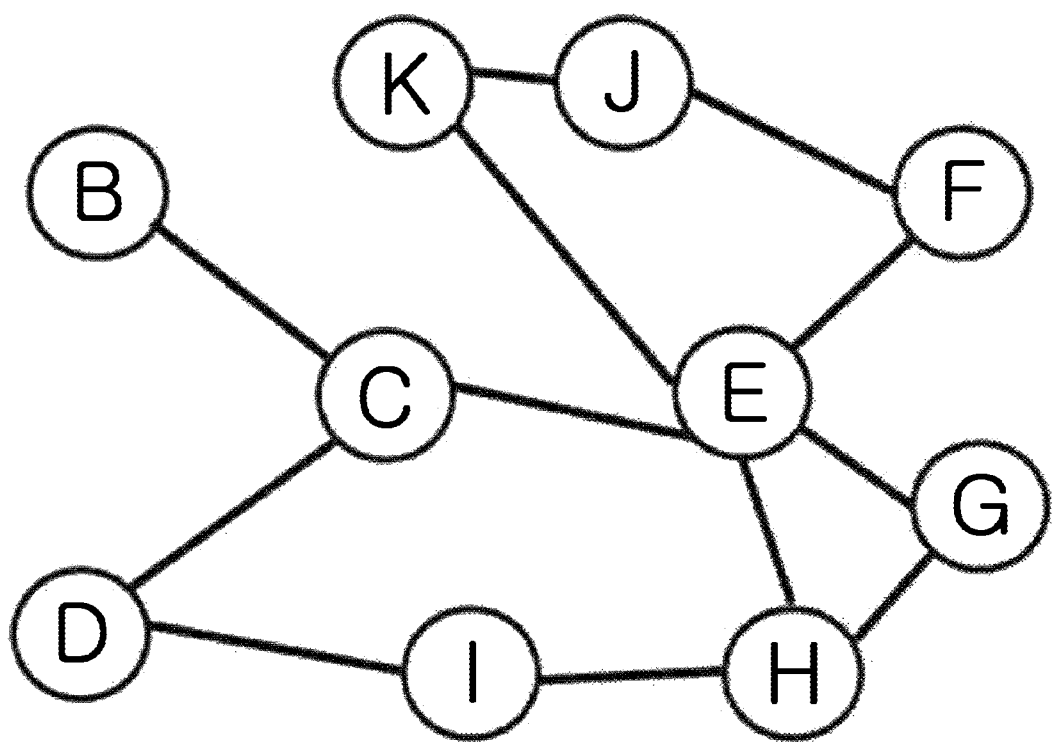
FIG. 4 is a diagram for describing a social relation between accounts based on a transaction ledger according to an embodiment of the present invention.

FIG. 4 is a diagram for describing a social relation between accounts based on a transaction ledger according to an embodiment of the present invention.

Referring to FIG. 4, the transaction between the respective addresses is used as a factor forming the social relation between the respective addresses to visually express the ledger of the corresponding transaction.

As a result, the social relation between accounts based on a transaction ledger according to an embodiment of the present invention may be derived from the transactions which occur among the respective accounts (B to K). For example, account B among accounts B to K transacts with one other account. Each of accounts D, F, G, I, J, and K transacts with two other accounts. Accounts C and H transact with three other accounts and account E transacts with five other accounts.

FIG. 5 is a diagram for describing parameters of respective nodes in a social relation between accounts according to an embodiment of the present invention.

Referring to FIG. 5, respective parameters of addresses B to K may be viewed.

In address B, the size of amount is 1, the number of neighborhood nodes is 1, the change ratio is 1.00%, and the level of identity verification is 95.00%.

In address C, the size of amount is 1.5, the number of neighborhood nodes is 3, the change ratio is 1.89%, and the level of identity verification is 90.00%.

In address D, the size of amount is 2.5, the number of neighborhood nodes is 2, the change ratio is 1.23%, and the level of identity verification is 95.23%.

In address E, the size of amount is 1, the number of neighborhood nodes is 5, the change ratio is 2.15%, and the level of identity verification is 10.25%.

In address F, the size of amount is 3.1, the number of neighborhood nodes is 2, the change ratio is 0.50%, and the level of identity verification is 99.98%.

In address G, the size of amount is 1.05, the number of neighborhood nodes is 2, the change ratio is 1.03%, and the level of identity verification is 7.65%.

In address H, the size of amount is 2.001, the number of neighborhood nodes is 3, the change ratio is 1.99%, and the level of identity verification is 100.00%.

In address I, the size of amount is 11.23, the number of neighborhood nodes is 2, the change ratio is 80.23%, and the level of identity verification is 56.65%.

In address J, the size of amount is 0.005, the number of neighborhood nodes is 2, the change ratio is 90.01%, and the level of identity verification is 70.00%.

In address K, the size of amount is 8, the number of neighborhood nodes is 2, the change ratio is 0.35%, and the level of identity verification is 80.00%.

FIG. 6 is a table in which parameters of respective nodes including local weights are organized according to an embodiment of the present invention.

Referring to FIG. 6, when the local weight of each node is calculated, the local weight of address B is 0.94050, the local weight of address C is 3.97346, the local weight of address D is 4.70293, the local weight of address E is 0.50148, and the local weight of address F is 6.16777.

The local weight of address G is 0.15900, the local weight of address H is 5.88354, the local weight of address I is 2.51545, the local weight of address J is 0.00070, and the local weight of address K is 12.75520.

In this case, it may be known that the sum of the local weights may be calculated as 37.60002.

SUM(LW)=37.60002

The local weight may be calculated by the following equation.

$$LW = SA * NH * (100\% - CR) * LV$$

SA: Size of Amt
NH: # of neighborhood addresses
CR: Change Ratio
LV: Level of Identity Verification As such, the local weight may be calculated by considering various factors including the size of amount, the number of neighborhood nodes, the change ratio, the level of identity verification, and the like.

However, the present invention is not limited thereto and in respect to the local weight, there may be a scheme of variously determining the local weight according to a feature of each transaction ledger.

FIG. 7 is a table in which parameters of respective nodes including static centrality are organized according to an embodiment of the present invention.

Referring to FIG. 7, when the static centrality for each node is calculated, the static centrality of address B is 0.02501, the static centrality of address C is 0.10568, the static centrality of address D is 0.12508, the static centrality of address E is 0.01334, and the static centrality of address F is 0.16404.

The static centrality of address G is 0.00423, the static centrality of address H is 0.15648, the static centrality of address I is 0.06690, the static centrality of address J is 0.00002, and the static centrality of address K is 0.33923.

In addition, the convergence value of the sum of the static centrality is 1.

SUM(Static Centrality)=1

The static centrality may be calculated by LW/SUM(LW).

The self ration should be defined in order to calculate the weighted centrality.

In this simulation, the self ratio is set to 15%.

SR=0.15

However, the present invention is not limited thereto and the numerical value of the self ratio may be variously defined according to the characteristics of each transaction ledger.

For example, the setting of the self ratio may vary depending on whether the transaction ledger is a game account, a carrier account, a blockchain account, or a bank account.

For example, when the transaction ledger is the game account, the self ratio may be preferably decreased and when the transaction ledger is the bank account, the self ratio may be preferably increased.

Further, the self ratio may vary depending on whether the transaction is made during the day or at night.

In addition, the setting of the self ratio may appropriately vary depending on whether the transaction is made during the day, how long the transaction is made, a transaction density, or whether the account is a credit account of a bank.

FIG. 8 is a table in which parameters of respective nodes including weight centrality are organized according to an embodiment of the present invention.

Referring to FIG. 8, the weighted centrality of address B, which is calculated according to a calculation equation of the weighted centrality is 1.36662, the weighted centrality of address C is 4.32544, the weighted centrality of address D is 3.20118, the weighted centrality of address E is 7.10174, and the weighted centrality of address F is 3.61798.

The weighted centrality of address G is 2.48203, the weighted centrality of address H is 4.41489, the weighted centrality of address I is 2.98871, the weighted centrality of address J is 3.49534, and the weighted centrality of address K is 4.60609.

The sum of the weighted centralities is 37.60002.

SUM(WC)=37.60002

Accordingly, it may be known that the sum of the weighted centralities and the sum of the local weights are the same as each other.

SUM(WC)=SUM(LW)

Figure 9:
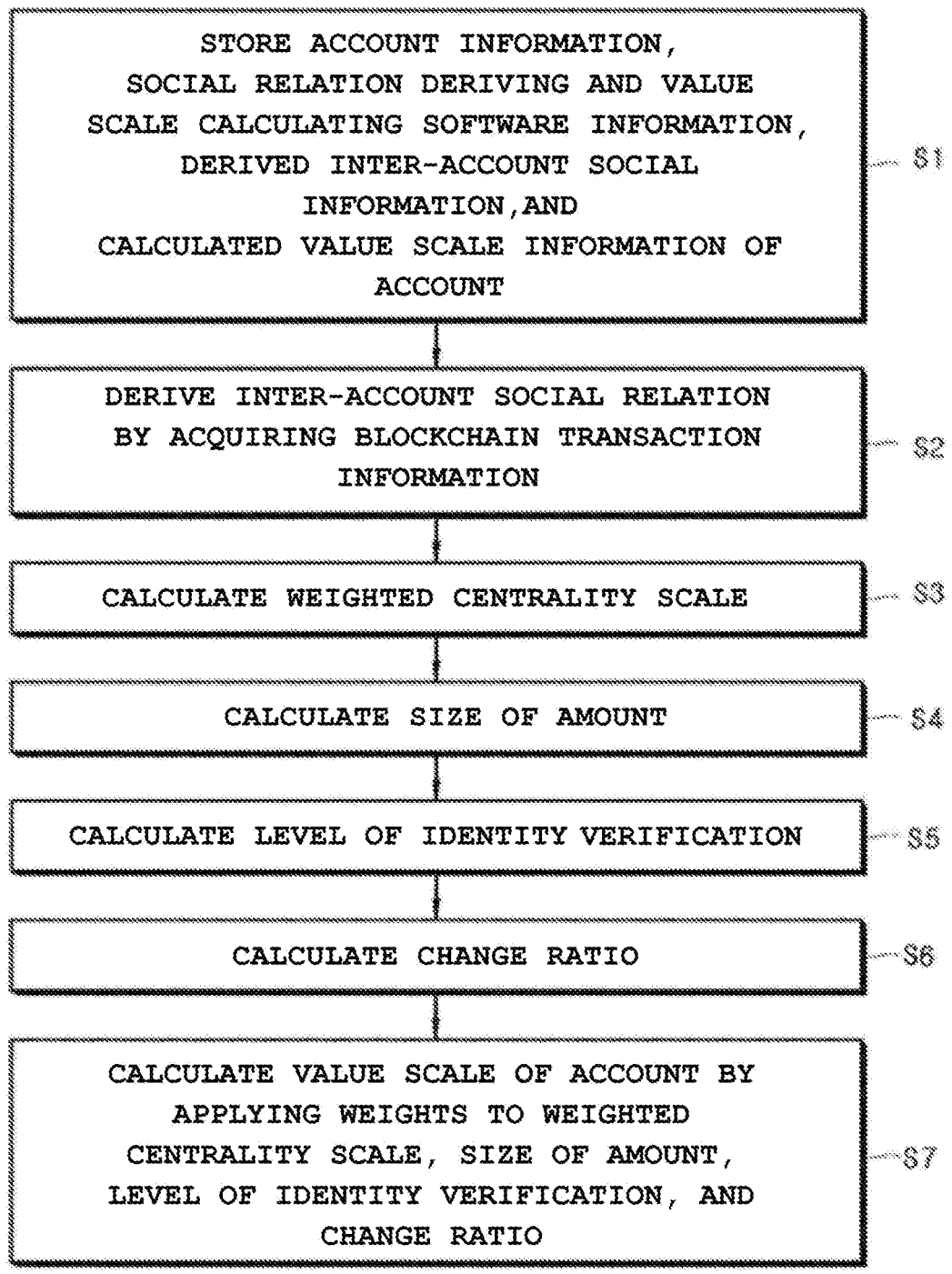
FIG. 9 is a flowchart for describing a method for deriving a social relation between accounts based on a transaction ledger according to an embodiment of the present invention.

FIG. 9 is a flowchart for describing a method for deriving a social relation between accounts based on a transaction ledger according to an embodiment of the present invention.

Referring to FIG. 9, the data storage unit 110 stores account information, inter-account social relation deriving and account value scale calculating software, derived inter-account social relation information, and the calculated value scale information of various accounts (S1).

The processor 120 derives the social relation between the blockchain addresses by acquiring, for a random blockchain address of which the value scale of the account is to be calculated, the blockchain transaction information of the corresponding blockchain address (S2).

The processor 120 calculates a weighted centrality scale between the corresponding blockchain address and another blockchain address based on the social relation derived from the acquired blockchain transaction information (S3).

The processor 120 calculates the size of amount for the corresponding blockchain address based on the social relation derived from the acquired blockchain transaction information (S4).

The processor 120 calculates the level of identity verification of the corresponding blockchain address based on the social relation derived from the acquired blockchain transaction information (S5).

The processor 120 calculates the change ratio for the corresponding blockchain address based on the social relation derived from the acquired blockchain transaction information (S6).

The processor 120 may calculate the value scale of the corresponding blockchain address by applying a predetermined weight to the weighted centrality scale, the size of amount, the level of identity verification, and the change ratio which are calculated (S7).

Here, steps S3 to S6 may be selectively performed and an order thereof may also be modified as needed. Further, step S7 may be performed by using values selectively executed in steps S3 to S6.

Figure 10:
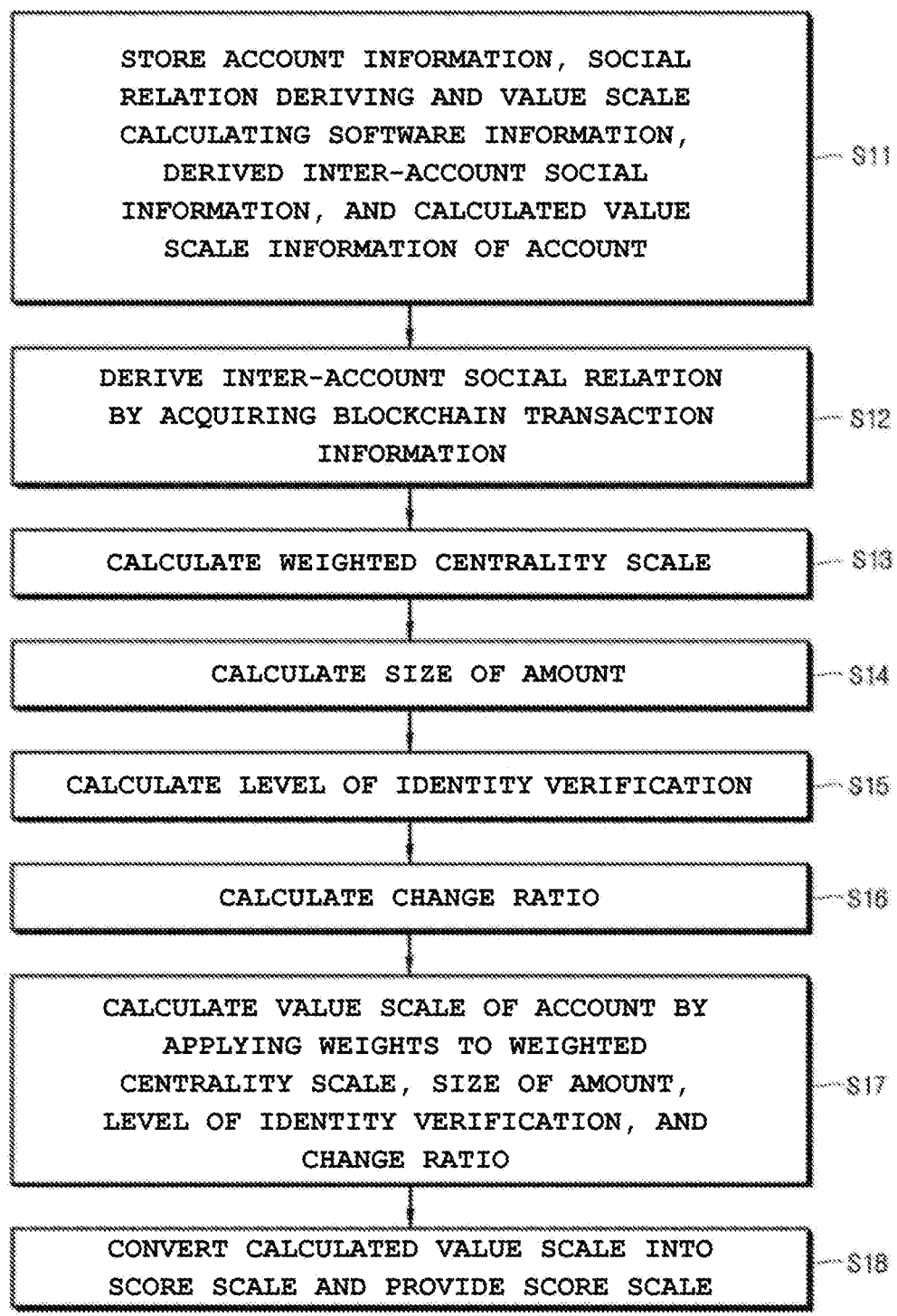
FIG. 10 is a flowchart for describing a method for deriving a social relation between accounts based on a transaction ledger according to an embodiment of the present invention.

FIG. 10 is a flowchart for describing a method for deriving a social relation between accounts based on a transaction ledger according to an embodiment of the present invention.

Referring to FIG. 10, since steps S11 to S17 are performed similarly to steps S1 to S7 of FIG. 9, detailed description will be omitted.

After steps S11 to S17 are performed, the processor 120 converts the calculated value scale into a score scale and provides the score scale (S18).

Here, steps S13 to S16 may be selectively performed and the order thereof may also be modified as needed. Further, steps S17 and S18 may be performed by using values selectively executed in steps S13 to S16.

Figure 11:
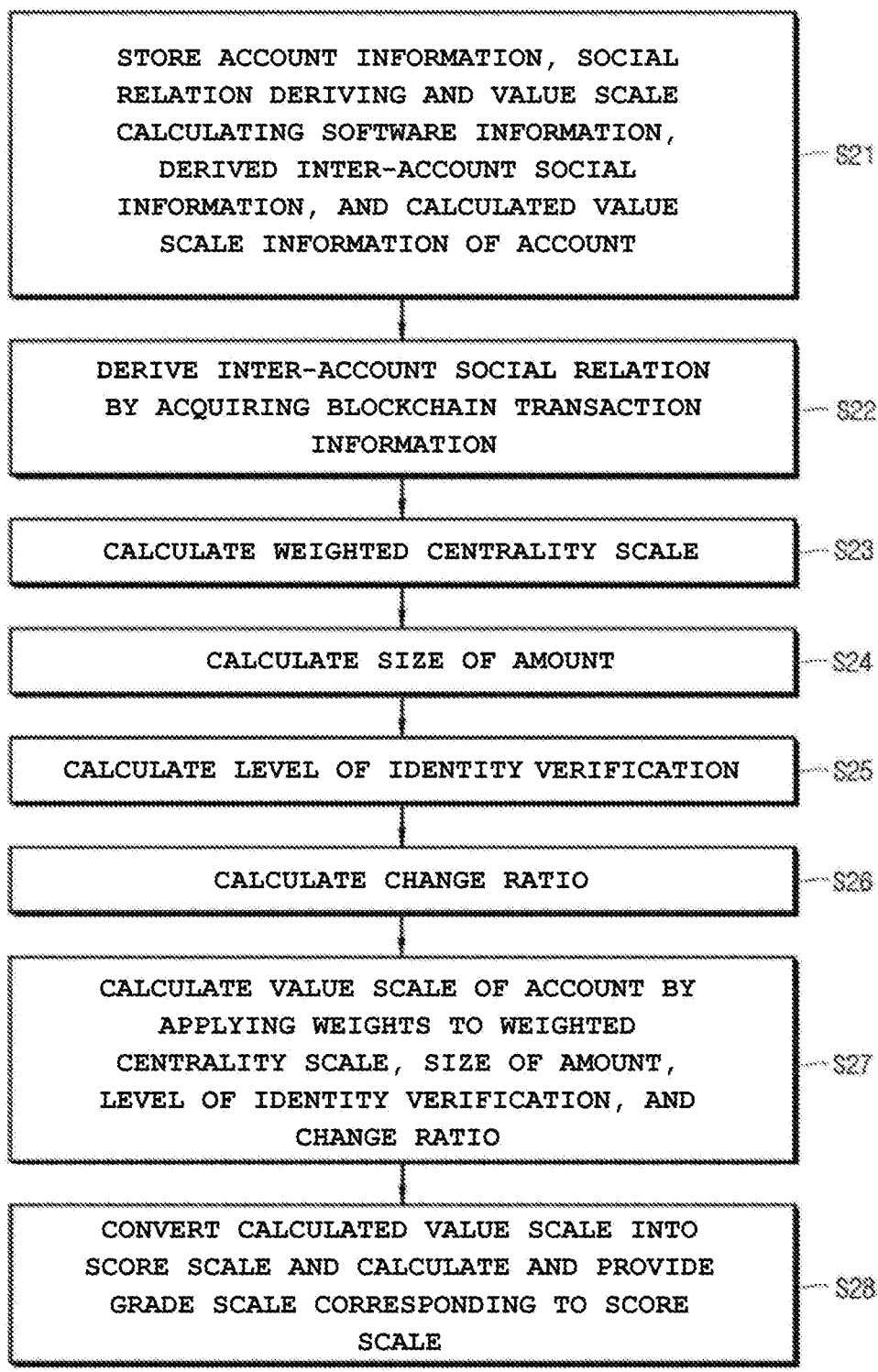
FIG. 11 is a flowchart for describing a method for deriving a social relation between accounts based on a transaction ledger according to an embodiment of the present invention.

FIG. 11 is a flowchart for describing a method for deriving a social relation between accounts based on a transaction ledger according to an embodiment of the present invention.

Referring to FIG. 11, since steps S21 to S27 are performed similarly to steps S1 to S7 of FIG. 9, detailed description will be omitted.

After steps S21 to S27 are performed, the processor 120 converts the calculated value scale into the score scale and determines to which section the corresponding score scale belongs to calculate and provide a grade scale (S28). Here, the grade scale is a grade defined by classifying scores for each section.

Here, steps S23 to S26 may be selectively performed and the order thereof may also be modified as needed. Further, steps S27 and S28 may be performed by using values selectively executed in steps S23 to S26.

Figure 12:
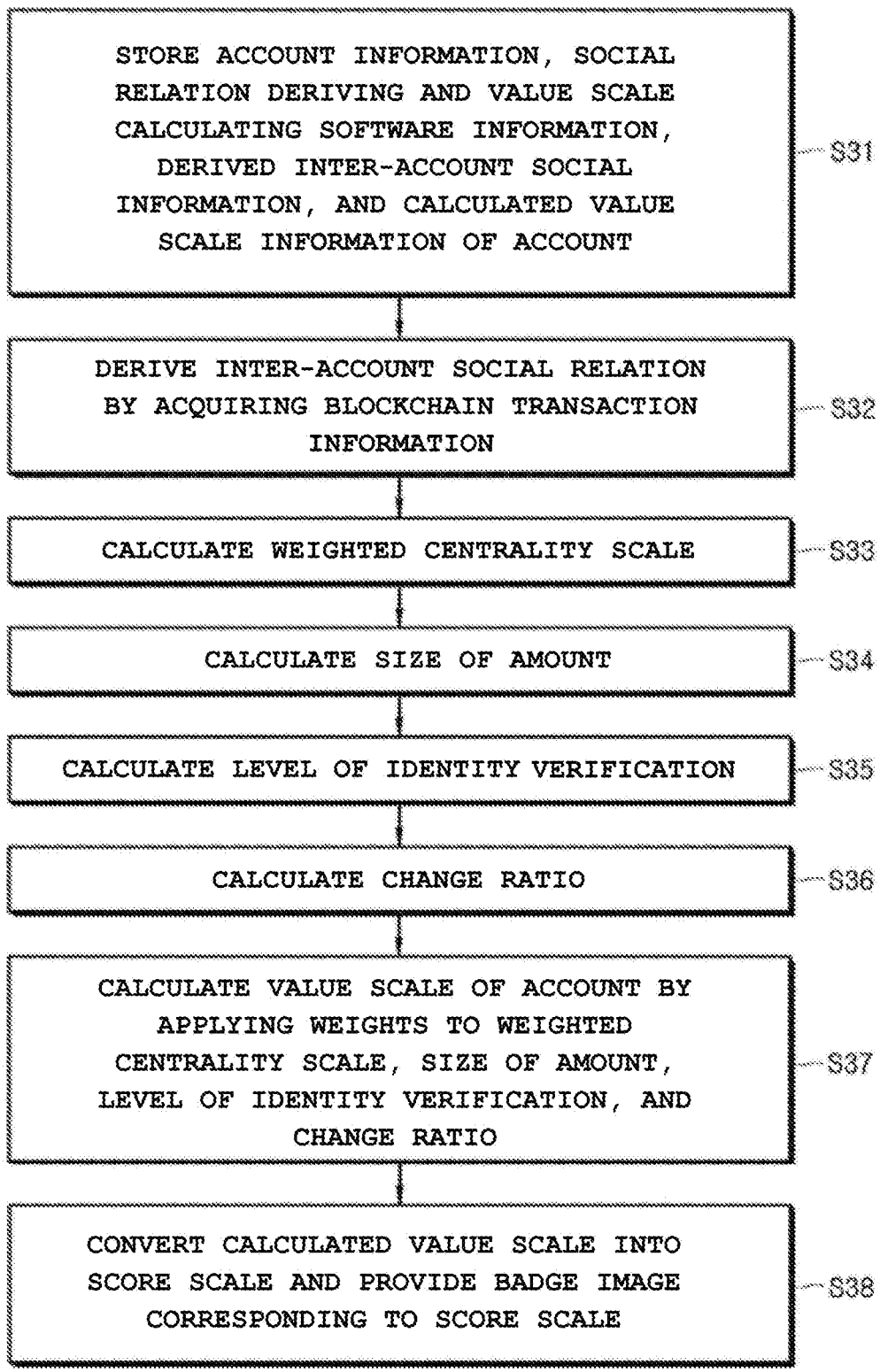
FIG. 12 is a flowchart for describing a method for deriving a social relation between accounts based on a transaction ledger according to an embodiment of the present invention.

FIG. 12 is a flowchart for describing a method for deriving a social relation between accounts based on a transaction ledger according to an embodiment of the present invention.

Referring to FIG. 12, since steps S31 to S37 are performed similarly to steps S1 to S7 of FIG. 9, detailed description will be omitted.

After steps S31 to S37 are performed, the processor 120 converts the calculated value scale into the score scale and determines to which badge the corresponding score scale belongs to calculate and provide a corresponding badge image (S38). For example, the value scale of the badge may be expressed by a plurality of badges according to a high or low value. For example, the badge may be selected among a diamond badge, a gold badge, a silver badge, and a bronze badge.

Here, steps S33 to S36 may be selectively performed and the order thereof may also be modified as needed. Further, steps S37 and S38 may be performed by using values selectively executed in steps S33 to S36.

Figure 13:
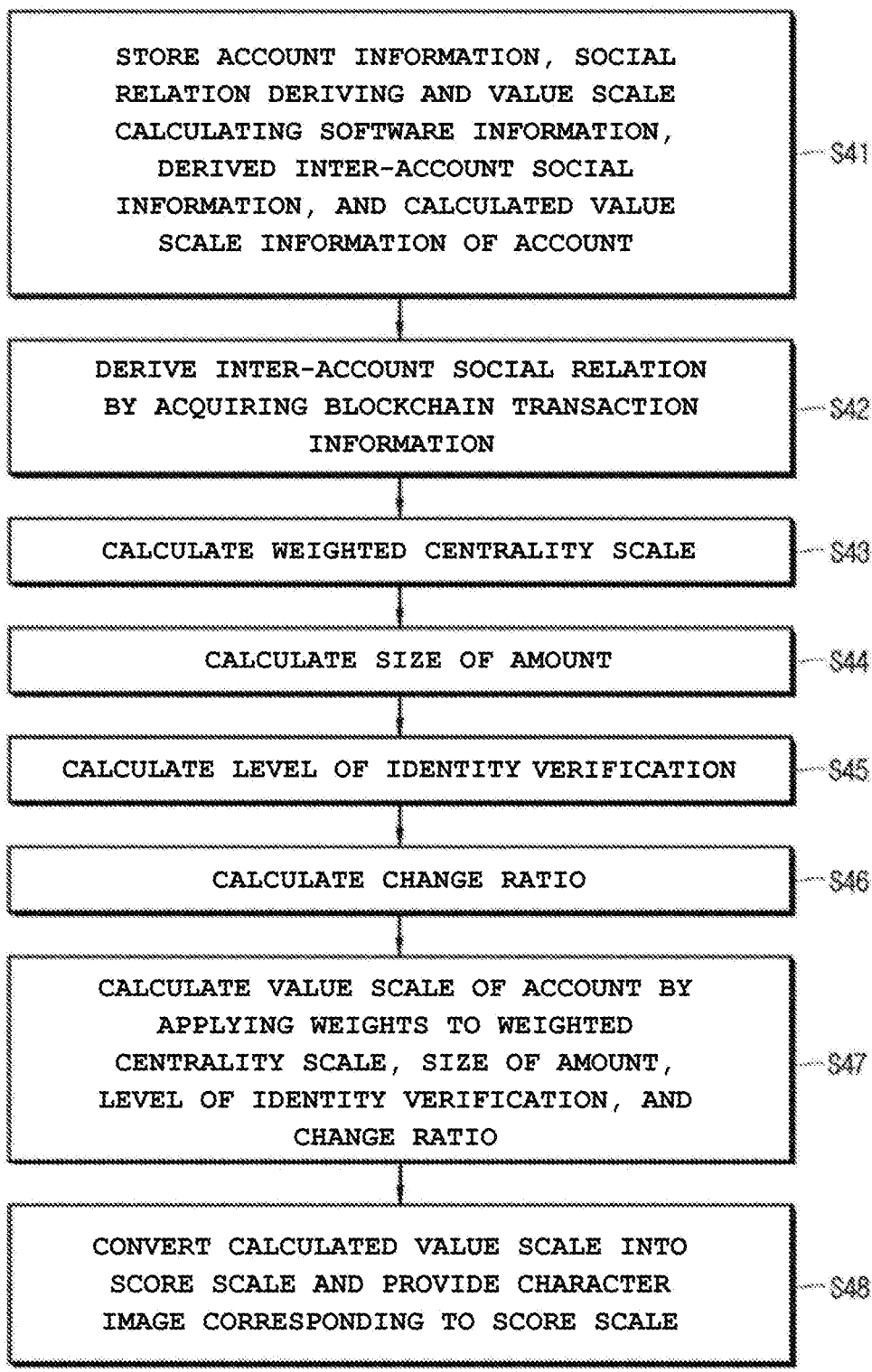
FIG. 13 is a flowchart for describing a method for deriving a social relation between accounts based on a transaction ledger according to an embodiment of the present invention.

FIG. 13 is a flowchart for describing a method for deriving a social relation between accounts based on a transaction ledger according to an embodiment of the present invention.

Referring to FIG. 13, since steps S41 to S47 are performed similarly to steps S1 to S7 of FIG. 9, detailed description will be omitted.

After steps S41 to S47 are performed, the processor 120 converts the calculated value scale into the score scale and determines to which character the corresponding score scale belongs to provide a corresponding character image (S48). For example, the character may be expressed by a plurality of characters according to a high or low value scale.

Here, steps S43 to S46 may be selectively performed and the order thereof may also be modified as needed. Further, steps S47 and S48 may be performed by using values selectively executed in steps S43 to S46.

Figure 14:
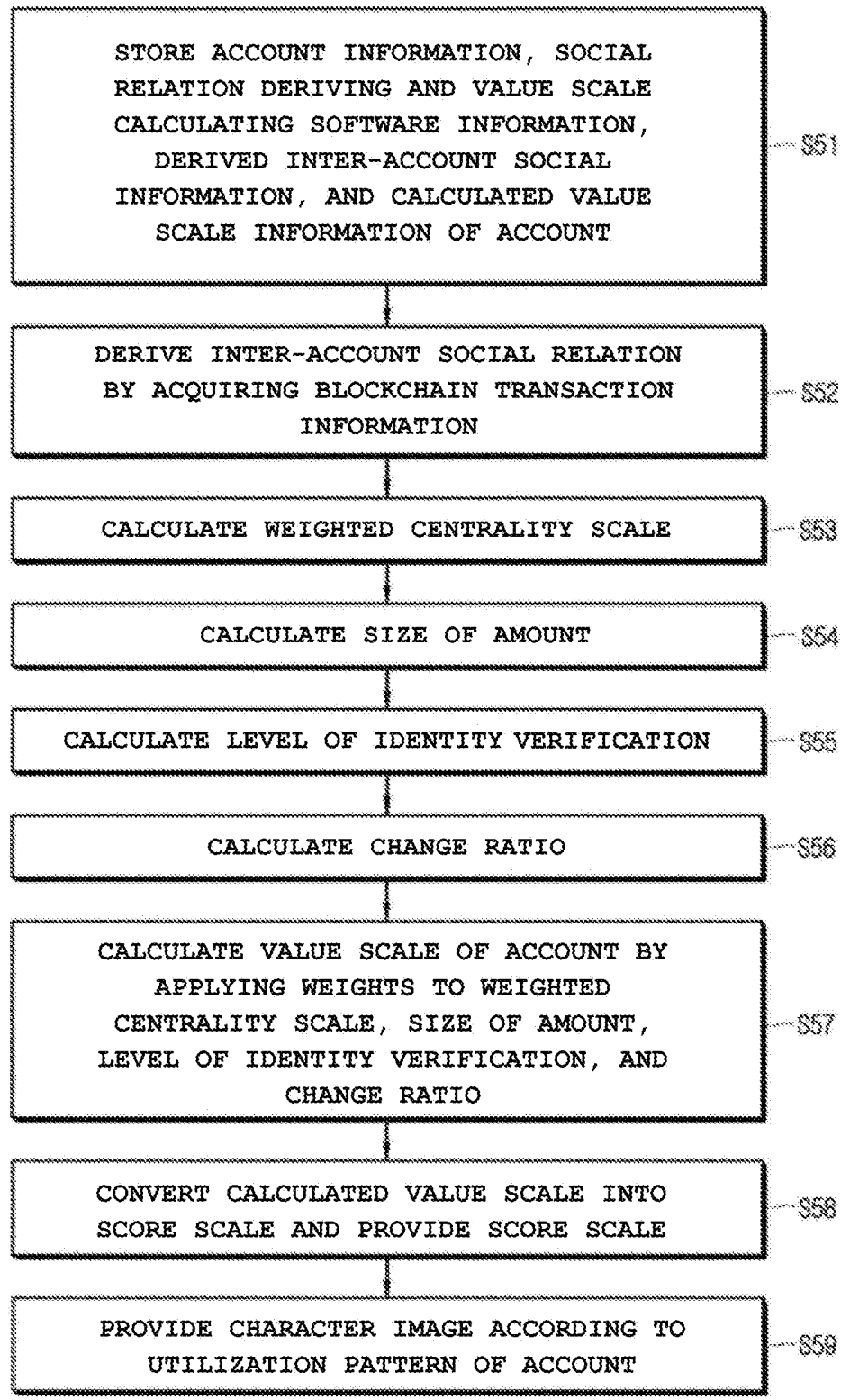
FIG. 14 is a flowchart for describing a method for deriving a social relation between accounts based on a transaction ledger according to an embodiment of the present invention.

FIG. 14 is a flowchart for describing a method for deriving a social relation between accounts based on a transaction ledger according to an embodiment of the present invention.

Referring to FIG. 14, since steps S51 to S57 are performed similarly to steps S1 to S7 of FIG. 9, detailed description will be omitted.

After steps S51 to S57 are performed, the processor 120 converts the calculated value scale into the score scale and provides the score scale (S58).

The processor 120 judges a utilization pattern of the account and determines to which character the corresponding utilization pattern belongs to provide a corresponding character image among a plurality of characters (S59). For example, the character may be expressed by a plurality of characters according to the utilization pattern of the account.

Here, steps S53 to S56 may be selectively performed and the order thereof may also be modified as needed. Further, steps S57, S58, and S59 may be performed by using values selectively executed in steps S53 to S56.

Figure 15:
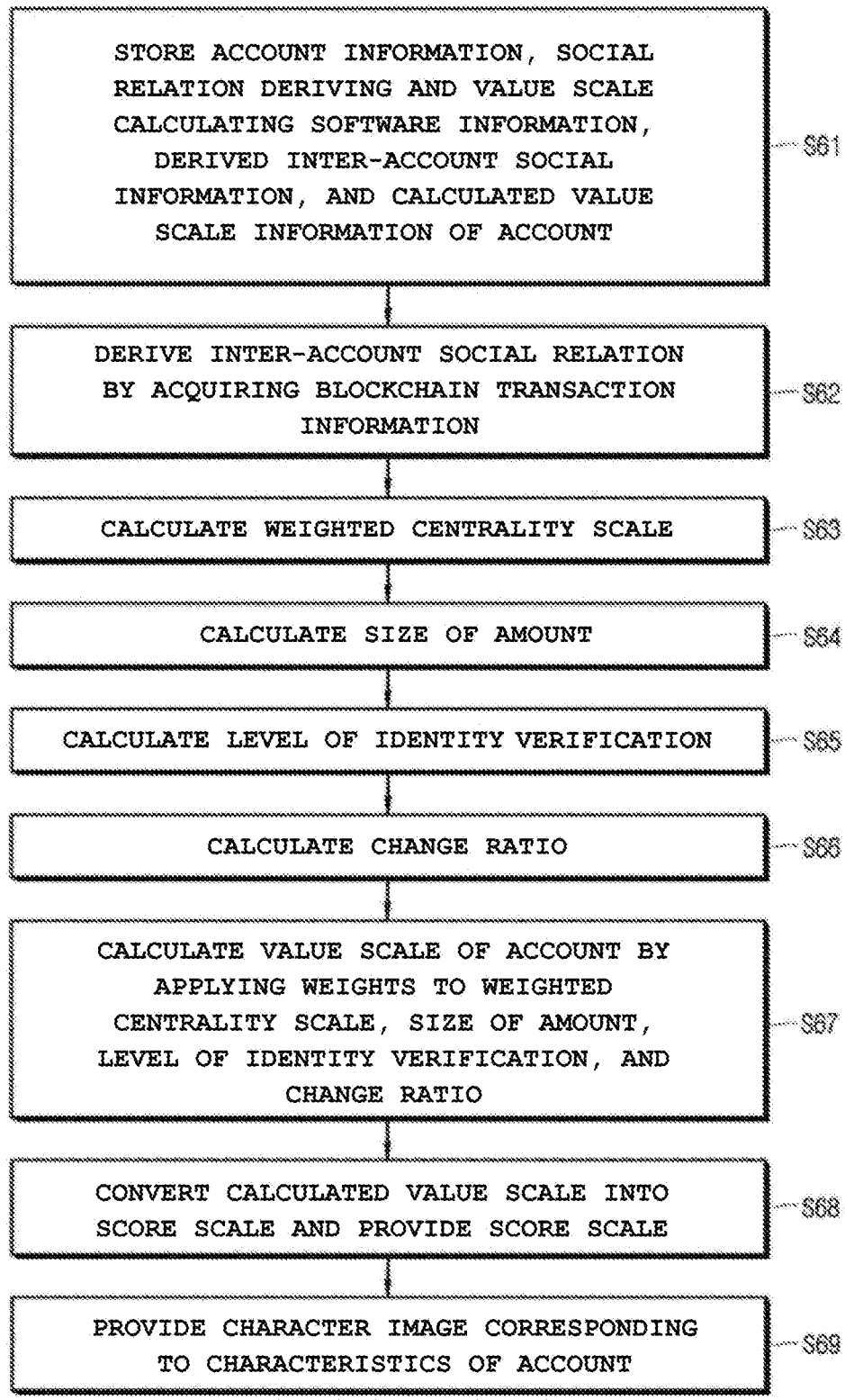
FIG. 15 is a flowchart for describing a method for deriving a social relation between accounts based on a transaction ledger according to an embodiment of the present invention.

FIG. 15 is a flowchart for describing a method for deriving a social relation between accounts based on a transaction ledger according to an embodiment of the present invention.

Referring to FIG. 15, since steps S61 to S67 are performed similarly to steps S1 to S7 of FIG. 9, detailed description will be omitted.

After steps S61 to S67 are performed, the processor 120 converts the calculated value scale into the score scale and provides the score scale (S68).

The processor 120 judges characteristics of the account and determines to which character the characteristics of the corresponding account belong to provide the corresponding character image among the plurality of characters (S69). For example, the plurality of characters may be classified according to the characteristics of the account. For example, the characteristics of the account may include the transaction size, the transaction frequency, a size of amount, and a transaction item.

Here, steps S63 to S66 may be selectively performed and the order thereof may also be modified as needed. Further, steps S67, S68, and S69 may be performed by using values selectively executed in steps S63 to S66.

Figure 16:
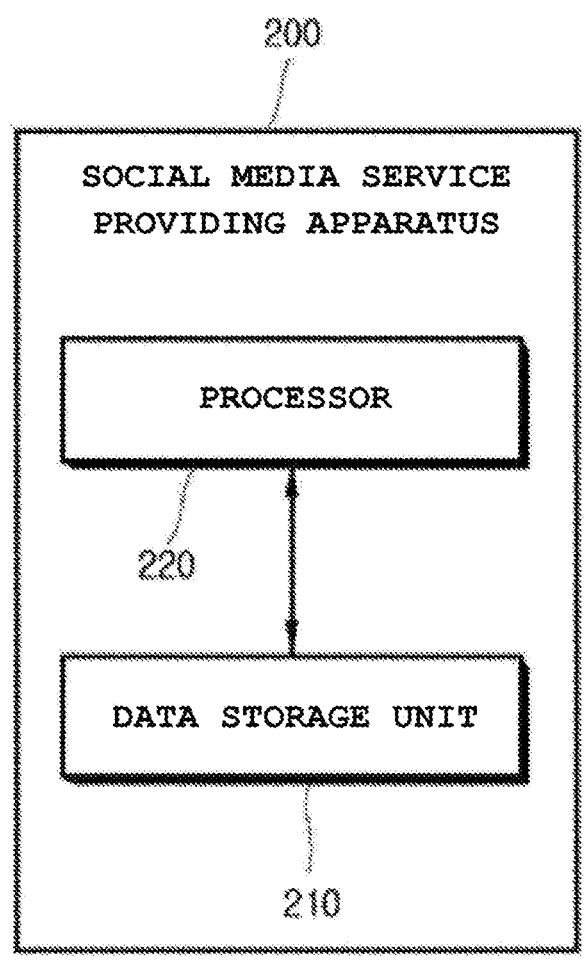
FIG. 16 is a diagram for describing an apparatus for providing a social media service using a social relation between accounts based on a transaction ledger according to an embodiment of the present invention.

FIG. 16 is a diagram for describing an apparatus for providing a social media service using a social relation between accounts based on a transaction ledger according to an embodiment of the present invention.

Referring to FIG. 16, the apparatus 200 for providing a social media service using a social relation between accounts based on a transaction ledger according to an embodiment of the present invention may be configured to include a data storage unit 210 and a processor 220 in link with the transaction ledger based inter-account social relation deriving apparatus 100.

The data storage unit 210 may store account information, inter-account social relation information, value scale information of the account, and social media service information.

The account information, the inter-account social relation information, and the value scale information of the account may be provided from the transaction ledger based inter-account social relation deriving apparatus 100.

The processor 220 enables transactions among users with accounts and may perform data processing and transmission/reception for supporting community activities by using the derived inter-account social relation and the value scales calculated from the derived inter-account social relation.

To this end, the processor 220 may inquire the inter-account social relation and the value scale information for the corresponding account for a user with a random account from the transaction ledger based inter-account social relation deriving apparatus 100 periodically or at a user's request.

The processor 220 may perform various data processing and transmission for the community activities among the accounts based on the stored social media service information stored in the data storage unit 210 and the inquired inter-account social relation and value scale information.

The processor 220 may implement that a random user transmits a message to another user. For example, the processor 220 may transmit the message to another user based on the social media service information when there is a request from the random user.

The processor 220 may implement that a random user transmits Bitcoin to another user. For example, the processor 220 may send Bitcoin to another user when there is the user's request. The processor 220 may implement that the random user receives Bitcoin from another user.

The processor 220 may allow the random user to post various contents desired by the user. For example, the processor 220 may post various contents when there is the user's request.

The processor 220 may implement posting random contents even to another social media service in link with another social media service platform.

The processor 220 may perform various financial transactions of the account, such as charging, withdrawal, and currency exchange.

The processor 220 may follow other users by paying Bitcoin. When other users are followed, contents posted by the corresponding users may be inquired or viewed.

The processor 220 may display a preference for the corresponding content while paying Bitcoin. For example, the processor 220 may express a positive response to the corresponding content. For example, the processor 200 may display the preference for the corresponding content by displaying LIKE.

The processor 220 may add a comment to a main content. The processor 220 may add a simple content including a text, an image, a video, or a project.

The processor 220 may implement that the random user gives a tip to another user. For example, the processor 220 receives a request from the random user to assign the tip to a user providing a corresponding content with respect to a good content.

For example, the processor 220 may vary a tip amount delivered to another user according to a strength or a time when the random user presses a terminal.

The processor 220 may make payment using escrow.

Besides, the processor 220 may make payment using Bitcoin.

The processor 220 may differentially apply a fee applied in the financial transaction according to the value scale of the account. However, the present invention is not limited thereto, and fees applied in various transactions in addition to the financial transactions may be differentially applied.

The processor 220 may differentially apply a transaction limit according to the value scale of the account.

The processor 220 may perform data processing and transmission for supporting the community activities by using the inter-account social relation or the value scale calculated for each account in order to provide psychological stability according to performing of social community activities and financial transactions based on the reliability of the owner of the account.

The processor 220 may allow owners of already secured accounts to implement the social media service to perform data processing and transmission for performing the financial transaction.

The processor 220 may perform the data processing and transmission for users who participate in the financial transaction using the account to form and join various financial transactions and various communities through the social media service.

Figure 17:
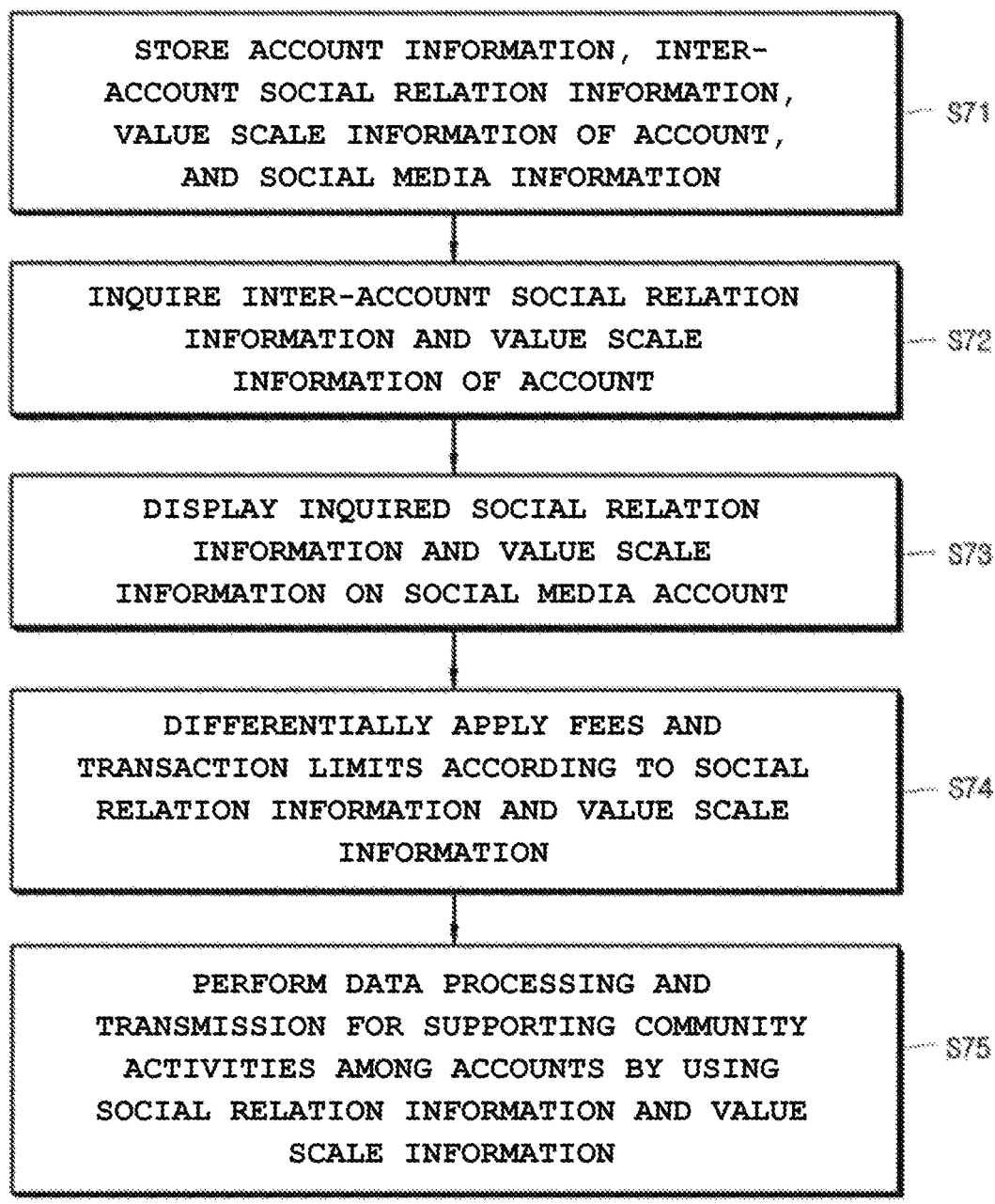
FIG. 17 is a flowchart for describing a method for providing a social media service using a social relation between accounts based on a transaction ledger according to an embodiment of the present invention.

FIG. 17 is a flowchart for describing a method for providing a social media service using a value scale of an account according to an embodiment of the present invention.

Referring to FIG. 17, the data storage unit 210 stores account information, inter-account social relation information, value scale information of the account, and social media service information (S71).

The processor 220 inquires the inter-account social relation and the value scale information for the corresponding account for a user with a random account from the transaction ledger based inter-account social relation deriving apparatus 100 periodically or at a user's request (S72).

The processor 220 may display the inquired inter-account social relation and value scale information of the account on the social media service account of an owner with the corresponding account (S73).

The processor 220 may differentially apply a fee and a credit limit applied in the financial transaction according to the inter-account social relation or the value scale of the account (S74).

The processor 220 performs data processing and transmission for supporting the community activities by using the inter-account social relation derived and the value scale calculated for each account in order to provide psychological stability according to performing of social community activities and financial transactions based on the account by owners of already secured accounts (S75).

The embodiments of the present invention described above is not implemented only through the apparatus and the method and can be implemented through a program which realizes a function corresponding to a configuration of the embodiments of the present invention or a recording medium having the program recorded therein. The recording medium may be executed in a user terminal in addition to a server.

While the embodiments of the present invention have been described above in detail, it is to be understood that the scope of the present invention is not limited to the disclosed embodiments, but, on the contrary, is intended to cover various modifications and equivalent arrangements included within the spirit and scope of the appended claims.

The invention claimed is:

1. An apparatus for deriving a social relation between accounts based on a transaction ledger, the apparatus comprising:
a data storage unit storing account information, software for deriving an inter-account social relation, and inter-account social relation information; and
a processor deriving the inter-account social relation based on a transaction ledger generated by transactions among users with the accounts and performing construction of a social media service based on the accounts by using the derived inter-account social relation and data processing and transmission/reception for supporting community activities among respective accounts,
wherein the processor provides the derived inter-account social relation to a social media service providing apparatus so as to be linked with a social media account,
wherein the data storage unit further stores value scale information of each account of the accounts, and social media service information including information on the social media account,
wherein the processor inquires the inter-account social relation and the value scale information for the social media account of a user, periodically or in response to a request from the user,
wherein the processor displays the inquired inter-account social relation and value scale information of the account, on the social media service account of the user who is an owner of the social media account, and
wherein the processor differentially applies a fee and a credit limit applied in a financial transaction according to the inter-account social relation or the value scale of the account.

2. The apparatus of claim 1, wherein the each account includes a blockchain address.

3. The apparatus of claim 1, wherein the processor derives the inter-account social relation by using transaction information between the accounts.

4. The apparatus of claim 1, wherein the transaction information includes at least one of transaction information between the each account and another account, and a transaction frequency information between the each account and the another account.

5. The apparatus of claim 1, wherein the processor calculates a value scale of the each account from the derived social relation, and
the data storage unit further stores the calculated value scale.

6. The apparatus of claim 5, wherein the processors calculates the value scale of the each account by using at least one of a weighted centrality scale, amount information of the each account, change ratio information, and a level of identity verification information.

7. The apparatus of claim 6, wherein the data storage unit stores the account information, inter-account social relation deriving and account value scale calculating software, the inter-account social relation information, and the calculated value scale information of the account,
the processor calculates a weighted centrality of each account for calculating the value scale of the each account in the inter-account social relation derived based on the transaction ledger generated by the transactions among the users with the accounts,
the processor calculates a weighted centrality scale of the each account by using a local weight factor determined for a random account and a weight centrality scale factor of a neighborhood account having the social relation with the each account,
the weighted centrality becomes a value acquired by adding a value acquired by reflecting a self ratio to the local weight of a node corresponding the random account and a value acquired by reflecting an external factor ratio without the self ratio to each sum of values acquired by dividing the weighted centrality of each node by a number of adjacent nodes to the corresponding node corresponding to the random account,
a self ratio is a parameter for reflecting, in calculating the weighted centrality of one node, a self factor of the corresponding node, and
the processor calculates the weighted centrality of the each account by an equation of:

$$WC(A)=LW(A)*sr+(1-sr)*(WC(N1)/NH(N1)+ \ldots +WC(Nn)/NH(Nn))$$

(however, WC represents the weighted centrality, WC(A) represents the weighted centrality of node A, LW represents a local weight, LW(A) represents the local weight of node A, sr represents a self ratio, WC(N1) represents the weighted centrality of first neighborhood node N1 of node A, WC(Nn) represents the weighted centrality of n-th neighborhood node Nn of node A, NH represents the number of neighborhood nodes, NH(N1) represents the number of neighborhood nodes of first neighborhood node N1 of node A, and NH(Nn) represents the number of neighborhood nodes of n-th neighborhood node Nn of node A).

8. The apparatus of claim 7, wherein the processor calculates the weighted centrality scale so that a sum of the weighted centrality scales of respective accounts converges to the sum of local weights of the respective accounts.

9. The apparatus of claim 7, wherein the local weight factor for the random account is determined as an independent value from the neighborhood account having the social relation with the each account.

10. The apparatus of claim 9, wherein the processor calculates the local weight of the each account by applying predetermined weights to the weighted centrality scale, a size of amount, the level of identity verification, and the change ratio which are calculated.

11. The apparatus of claim 9, wherein the processor calculates the local weight of the each account by an equation of:

$$LW=SA*NH*(100\%-CR)*LV,$$

where:
LW: Local Weight;
SA: Size of Amt;
NH: # of neighborhood addresses;
CR: Change Ratio; and
LV: Level of Identity Verification.

12. The apparatus of claim 5, wherein the value scale includes a value evaluation scale by evaluation, a score scale, or a grade scale.

13. The apparatus of claim 5, wherein the processor expresses the value scale by a plurality of badge images or a plurality of character images according to an importance, a utilization pattern, or characteristics of the each account.

14. The apparatus of claim 13, wherein the characteristics of the each account include at least one of a transaction size, a transaction frequency, a size of amount, and a transaction item.

15. A method for deriving a social relation between accounts based on a transaction ledger, the method comprising:
acquiring transaction information for a random account based on a transaction ledger generated by transactions among users with accounts;
deriving an inter-account social relation based on the acquired transaction information;
performing construction of a social media service based on the account by using the derived inter-account social relation and data processing and transmission/reception for supporting community activities among the respective accounts;
providing the derived inter-account social relation to a social media service providing apparatus so as to be linked with a social media account;
storing value scale information of each account of the accounts, and social media service information including information on the social media account;
inquiring the inter-account social relation and the value scale information for the social media account of a user, periodically or in response to a request from the user;
displaying the inquired inter-account social relation and value scale information of the account, on the social media service account of the user who is an owner of the social media account; and
differentially applying a fee and a credit limit applied in a financial transaction according to the inter-account social relation or the value scale of the account.

16. The method of claim 15, further comprising:
calculating a value scale of the each account from the derived social relation.

17. The method of claim 16, wherein the calculating of the value scale includes
calculating a weighted centrality scale, a size of amount, a level of identity verification, and a change ratio based on the acquired transaction information, and
calculating a value scale of the account by applying predetermined weights to the weighted centrality scale, the size of amount, the level of identity verification, and the change ratio which are calculated.

18. An apparatus for providing a social media service using a social relation between accounts based on a transaction ledger, the apparatus comprising:
a data storage unit storing account information, inter-account social relation information, and social media service information; and
a processor enabling transactions among users with the accounts based on the account information, deriving a social relation between respective accounts based on a transaction ledger generated by the transactions, and performing construction of a social media service based on the accounts by using the derived social relation between the respective accounts and the social media service information and data processing and transmission/reception for supporting community activities among the respective accounts,
wherein the processor provides the derived inter-account social relation to a social media service providing apparatus so as to be linked with a social media account,
wherein the data storage unit further stores value scale information of each account of the accounts, and social media service information including information on the social media account,
wherein the processor inquires the inter-account social relation and the value scale information for the social media account of a user, periodically or in response to a request from the user,
wherein the processor displays the inquired inter-account social relation and value scale information of the account, on the social media service account of the user who is an owner of the social media account, and
wherein the processor differentially applies a fee and a credit limit applied in a financial transaction according to the inter-account social relation or the value scale of the account.

* * * * *